Figure 1:
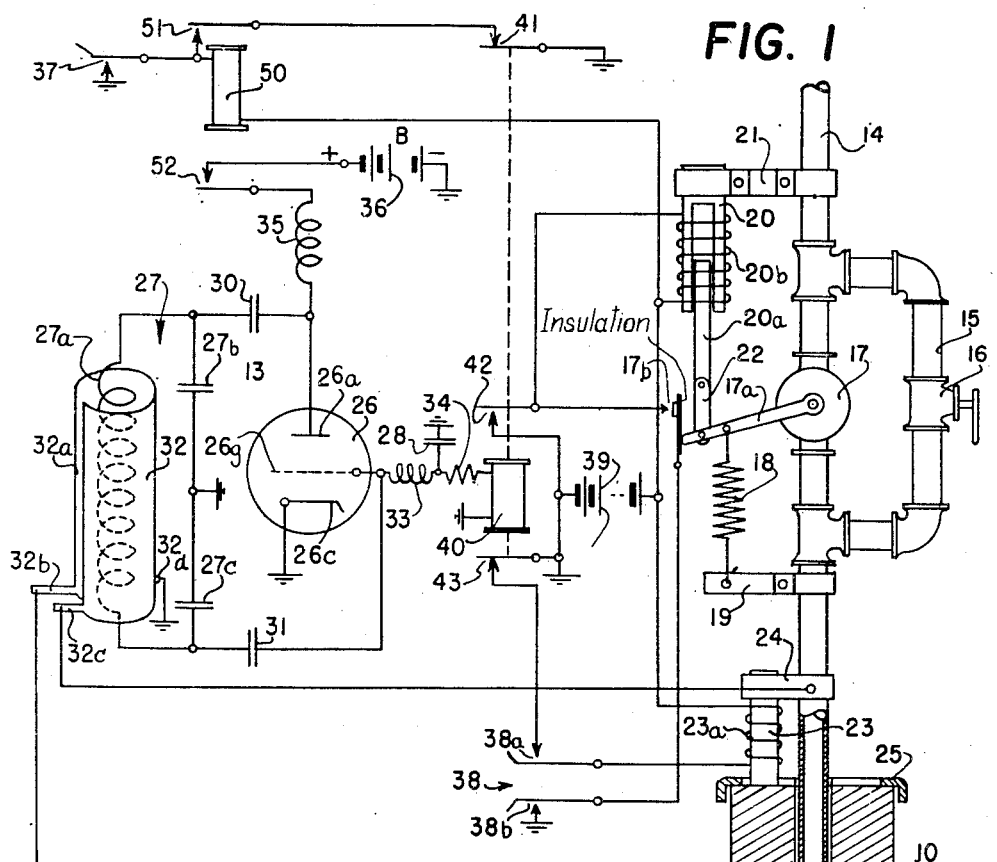

Dec. 7, 1948.  H. F. STORM  2,455,822
APPARATUS FOR HEAT TREATING METAL PARTS
Filed June 7, 1944

INVENTOR
HERBERT F. STORM
By McCanna & Morsbach
ATTORNEYS

Patented Dec. 7, 1948

2,455,822

UNITED STATES PATENT OFFICE 2,455,822

APPARATUS FOR HEAT-TREATING METAL PARTS

Herbert F. Storm, West Allis, Wis., assignor to Sunbeam Corporation, a corporation of Illinois Application June 7, 1944, Serial No. 539,105

10 Claims. (Cl. 266—4)

1

The present invention relates to methods and apparatus for heat treating metal parts and more particularly to improved methods and apparatus for utilizing a high frequency magnetic field to heat the inner surface of a hollow ferrous metal part to a hardening or quenching temperature and for then quenching the heated surface.

It is common practice to utilize high frequency magnetic fields to heat a selected surface zone of a ferrous metal part for the purpose of case hardening the selected zone without destroying the ductility of the other portions of the part. Usually the induction heating is accomplished by bring an inductor coil into proximity with the selected surface zone and then energizing the inductor from a high frequency electronic oscillator for a predetermined time interval which is calculated to heat the selected surface zone to the desired quenching or hardening temperature. As is well known, the magnetic field causes hysteresis and eddy current losses to be manifested as heat in the selected surface zone of the part, and the extent of heating is determined by the intensity of the generated magnetic field. This of course means that the rise in temperature which is realized in a selected time interval is dependent upon and changes with variations in the voltage of the current source from which the high frequency energy is derived, i. e., the current source from which anode current is supplied to the high frequency oscillator tube.

Any heating interval selected on an empirical or calculated basis cannot take such source voltage variations into account, due to the unpredictability thereof, with the result that time and heat energy may be wasted when the induction heating is effected on a timed basis. Also, in the use of induction heating apparatus to heat the internal surfaces of small metal parts, such, for example, as rivet dies, nuts, or the like, the space problem becomes serious. Thus, the usual internal surface heating inductor is in the form of a helical coil of hollow copper tubing which is adapted to be inserted into the part opening in such manner that the generated magnetic field is parallel to the axis of the opening, and is constructed of copper tubing of sufficiently large diameter to permit circulation of a liquid coolant therethrough. Such an inductor obviously is not well adapted for use in the internal surface heat-

2 ing of bore holes having small diameters. Further, the known prior art arrangements for induction heating and subsequent quenching of small metal parts usually require either manual handling of the parts or the use of relatively complicated apparatus, in successively effecting the heating and quenching operations.

It is an object of the present invention, therefore, to provide improved high frequency induction heating methods and apparatus wherein the above-noted problems are wholly obviated.

It is another object of the invention to provide improved methods and apparatus for the high frequency induction heating of magnetic metal parts to a uniform predetermined temperature regardless of variations in the voltage of the current source from which the high frequency energy is derived.

It is a further object of the invention to provide an improved and fully automatic arrangement for discontinuing the application of the high frequency magnetic field to each metal part when the field traversed surface zone of the part is heated to a predetermined temperature.

According to a more specific object of the invention, the sharp change in magnetic permeability of the metal part which occurs when the part is heated to the desired predetermined temperature, is utilized to discontinue the application of the high frequency field to the part.

It is a still further object of the invention to provide an improved arrangement for automatically effecting movement of each metal part from a heating position to a quenching position immediately the field traversed surface zone of the part is heated to the desired predetermined temperature.

In accordance with still another object of the invention movement of each part from its heating position to its quenching position is automatically effected in response to the change in permeability of the part which occurs when the part is heated to the desired quenching or hardening temperature.

According to a further object of the invention the apparatus is provided with improved facilities for flowing a quenching liquid against the heated zone of each metal part after it is heated to the desired predetermined temperature, and the flow of quenching liquid is automatically changed in response to the change in permeability of the part which occurs when the part is heated to the desired quenching or hardening temperature.

It is a further object of the invention to provide exceedingly simple and completely reliable induction heating apparatus for easily and rapidly heating the internal surfaces of hollow metal parts to a predetermined temperature.

It is still further and more specific object of the invention to provide improved induction heating apparatus of the character described, which is particularly adapted for use in heating the internal surfaces of bore holes or the like of small diameter.

Figure 2:
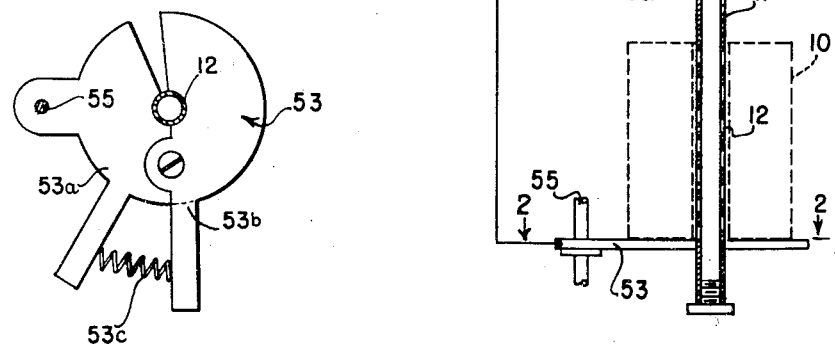

The invention, both as to its organization and method of operation, together with further objects and advantages thereof will best be understood by reference to the specification taken in connection with the accompanying drawings in which:

Fig. 1 schematically illustrates improved high frequency induction heating apparatus characterized by the features of the present invention; and Fig. 2 is a sectional view taken along the lines 2—2 in Fig. 1.

Referring now to the drawings, the improved high frequency induction heating and quenching apparatus there illustrated is well adapted for use in hardening the internal surfaces of small rivet dies without imparing the ductility of the outer die segments. A typical die of this character is indicated in section at 10, as being provided with a bore hole 10a extending longitudinally thereof. It is of cylindrical form having an outside diameter of approximately one inch, is approximately two inches in length, is provided with a central bore hole having a diameter of three-sixteenths of an inch, and may be formed of any suitable steel having magnetic properties and the required toughness. In using this die, a steel wire segment is inserted into the bore hole 10a having a length such that one end thereof projects upwardly from one end of the die. A powerful blow is then brought to bear against the projecting portion of the wire segment, with the result that the projecting portion of the wire segment is flattened to form the rivet head. Incident to this blow, that portion of the wire segment disposed within the bore hole is swelled against the bore hole surfaces, thus causing severe stresses to be developed within the die in directions extending radially of the bore hole axis. In order that the die structure may absorb these stresses without undue wear or failure, the inside of the bore hole must be hardened. Since hardness and brittleness are paired characteristics in many steels, it is necessary that the hardening of the internal die surfaces be effected without hardening of the other portions of the die. The use of known methods of case hardening the internal die surfaces results in a rather complicated and critical procedure. In accordance with one conventional method, the entire die is first heated throughout and hardened throughout, following which the die is reheated for tempering, in order to reduce the brittleness in the outer die section. This tempering process requires close attention in order to be successful. For example, the heat must be applied long enough to bring the outer section of the die up to the desired tempering temperature, but must not be applied long enough to destroy the hardness of the internal die surfaces. The present improved apparatus is well adapted for use in hardening the internal die surfaces without in any way disturbing the ductility or rendering brittle the outer die sections.

Briefly considered, this apparatus comprises a rod-like inductor element 11 in the form of a straight elongated copper tube which is adapted to be snugly received within the bore hole 10a of the rivet die 10 or another hollow metal part; a high frequency oscillator indicated generally at 13 for impressing a high frequency voltage between the end portions of the inductor element 11; and a quenching liquid supply system comprising the valved pipes 14 and 15 for flowing a quench and cooling liquid, such, for example, as water or oil through the inductor element 11. The oscillator 13 is of the well known Colpitts type, being provided with a three electrode electron discharge tube 26 having output electrodes 26a and 26c coupled through a coupling condenser 30 to a tuned oscillatory circuit 27. This circuit is comprised of an inductance coil 27a shunted by series tuning condensers 27b and 27c and may, for example, be tuned to a resonant frequency of one-half megacycle. Sustained operation of the oscillator is obtained by impressing that portion of the oscillatory voltage which appears across the condenser 27c between the input electrodes 26g and 26c of the tube 26 through a coupling condenser 31. The grid circuit of the tube 26 also includes a biasing network made up of the operating winding of a control relay 40 and a series connected resistor 34, the two identified elements being connected in series between the input electrodes of the tube 26 through a high frequency filter choke 33 and being by-passed to ground for high frequency currents by means of a filter condenser 28. Anode current is supplied to the space current path of the tube 26 from a direct current source 36 through the contacts 52 of a start-stop circuit breaker or relay 50 and a high frequency choke inductance 35. This inductance performs the function of preventing the high frequency voltage developed across the oscillatory circuit 27 from effecting high frequency current flow through the current source 36. As will be evident from the following explanation, considerable power is required to heat the internal surfaces of the die 10 to a quenching temperature and for that reason it is usually not practical to use a battery as the anode current source for the tube 26. It will be understood, therefore, that the battery indication is used for convenience only and that in practice this source may comprise the usual alternating current voltage step up and rectifying facilities, and hence may be subject to voltage variations in response to changes in the load imposed thereon and also in response to fluctuations in the input voltage thereto.

The inductor element 11 comprises a part of a single turn pickup circuit which is inductively coupled to the inductance element 27a of the oscillatory circuit 27. More in detail, this pickup circuit comprises a cylindrical copper sheath 32 which closely surrounds the coil 27a and is provided with a slit 32a extending longitudinally thereof to interrupt the continuity of the conductive path around its circumference. Intermediate the edges defining the slit 32a, the sheath 32 is grounded as indicated at 32d in order to preclude any possibility of a high voltage appearing upon the inductor element 11 which might be dangerous to users of the apparatus. This sheath is also provided with terminal parts 32b and 32c adjacent the edges of the slit 32a, which parts are respectively connected to the end portions of the inductor element 11. Thus the terminal part 32c is connected to the upper end portion of the inductor element 11 through a copper or other non-magnetic conductive bracket 24. The opposite terminal part 32b is connected to a pivotally mounted work supporting assembly 53 of paddle shaped contour, the parts of which are likewise formed of copper or another non-magnetic conductive metal. This assembly is comprised of pivotally connected jaw members 53a and 53b which are tensioned to close upon the conduit 12 by means of a biasing spring 53c, the members 53a being pivotally mounted upon a pivot rod 55 to permit the assembly to be moved into and out of embracing engagement with the inductor element 11. The spring biased engagement of the jaws 53a and 53b with the inductor element 11 insures a good electrical connection between this element and the parts of the assembly 52. The die supporting arrangement thus provided facilitate placement of the die 10 telescopically over the inductor element 11 and removal of the die from the inductor element after the heating and quenching operations are completed in the manner explained below.

As indicated above, the die 10 is slidably movable along the inductor element 11 from a heating position to a cooling or quenching position. The heating position of the die is illustrated in full lines in Fig. 1 of the drawing, the upper peripheral portion of the die being held within the edges of a frame member 25 which may be rigidly mounted adjacent the upper end of inductor element 11 in any suitable manner. With the die in this position it is obviously gravity biased to slide downward along the inductor element 11 to the dotted line quenching position wherein it is supported by the member 53. For the purpose of flowing the quench liquid against the heated internal surfaces of the die when it occupies the quenching position, the inductor element 11 is provided with a number of small wall openings 12 which are spaced circumferentially around the inductor element and extend upward from the supporting surface of the member 53 along the element 11 a distance equal to the length of the die. A holding magnet 23 suitably supported from the bracket 24 and adapted for energization from a current source 39 is utilized to hold the die 10 in its elevated heating position for the duration of the heating interval. This magnet is arranged to be energized through the contacts of a switch 38 and may be de-energized under the control of the relay 40.

As indicated above, the conduit system comprising the two conduits 14 and 15 is utilized to flow a quenching liquid through the inductor element 11 for the dual purpose of preventing this inductor element from overheating during energization of the element from the high frequency oscillator 13 and of flowing the quenching liquid through the openings 12 against the internally heated surfaces of the die 10 after the die has been moved to its cooling or quenching position. The rate of quenching liquid flow required to prevent the inductor element 11 from overheating is substantially less than that required for effective quenching of the internally heated surfaces of the die after the heating operation is completed. In order, therefore, to increase the rate of quench liquid flow through the inductor element 11 coincident with movement of the die 10 from its heating position to its quenching position, an electromagnetically controlled valve 17 is connected in parallel with the valved conduit 15. This valve includes an actuating arm 17a and is normally biased to its closed setting by means of a tension spring 18, the opposite ends of which are anchored to the arm 17a and to a bracket piece 19 projecting horizontally from the upper end of the inductor element 11. Under normal conditions and during a die heating operation, the flow of quenching liquid through the inductor element 11 is exclusively controlled by the setting of a valve 16 included in the conduit 15, this valve being suitably adjusted to permit an absolute minimum flow of quenching liquid through the inductor element 11 consistent with the desired end of preventing this element from over-heating. For the purpose of pivoting the actuating arm 17a, thereby to open the valve 17 and thus increase the flow of quenching liquid through the inductor element 11, an electromagnetic solenoid 20 is provided. This solenoid is supported at one end of the bracket 21 carried by the conduit 14 and includes a plunger 20a which is connected to the outer end of the arm 17a through a link element 22. The operating winding 20b of this solenoid is arranged for energization from the current source 39 under the control of the relay 40. As pointed out above, operation of the oscillator 13 to energize the inductor element 11 is under the control of start-stop circuit breaker 50. This circuit breaker is arranged for energization from the current source 39 through the contacts of a self-restoring start key or switch 37.

In considering the operation of the above described apparatus it will be understood that before initiating operation of this oscillator 13, a die is first telescoped over the inductor element 11 and moved to the described heating position. To this end, the supporting assembly 53 is pivoted away from the inductor element 11 leaving the lower end of this element free to project within the bore hole 10a of the selected die. The die may now be telescoped over the inductor element 11 and elevated to its heating position against the frame 25. In order to retain the die in this position, the switch 38 is closed to prepare a holding circuit for the solenoid 20 and to complete a circuit through the contacts 43 of the relay 40 for energizing the winding 23a of the holding magnet 23. With this magnet energized, the die 10 is securely held in its elevated position. Following the described operations the single turn inductor pickup circuit may be completed by reversely pivoting the supporting assembly 53 to re-engage the jaws 53a and 53b with the lower end of the inductor element 11, an electrical connection between the identified parts being insured through the spring biased engagement of the jaws with the circumferential surface of the inductor element. The final preparatory operation is that of opening the valve 16 to initiate the flow of quenching liquid through the inductor element 11.

In order to initiate operation of the oscillator 13 following the preparatory steps just described, the key 37 is actuated to its closed circuit position to complete an obvious circuit for energizing the circuit breaker 50 from the current source 39. This circuit breaker, in operating, locks up in a circuit which includes the current source 39 and the contacts 41 and 51. At its contacts 52, the circuit breaker 50 completes an obvious path through the filter choke 35 for connecting the positive terminal of the anode current source 36 to the anode 26a of the tube 26. Incident to the last mentioned switching operation, operation of the oscillator 13 is initiated. As previously mentioned, operation of the oscillator 13 is sustained by impressing the generated high frequency voltage appearing across the condenser 27c upon the cathode-grid circuit of the tube 26 through the coupling condenser 31. The bias voltage appearing between the cathode and grid of this tube is developed by grid rectification of the current traversing the winding of the relay 40 and the resistor 34.

Due to the magnetic coupling between the tuning inductance 27a of the oscillator output circuit 27 and the pickup sheath 32, and the high turn ratio between the inductance element 27a and the single turn inductor pickup circuit, a high frequency current having a large order of magnitude is caused to traverse the inductor element 11. Since the inductor pickup circuit is of low impedance and is grounded at the point 32d, all exposed parts thereof are at a low potential. In this regard it is noted that the connections between the terminal parts 32b and 32c, the supporting bracket 24 and the supporting member 53 are made as short as possible in order to minimize the impedance of the inductor pickup circuit.

The high frequency current traversing the inductor element 11 causes a high frequency magnetic field to be developed circumferentially of this element, i. e. peripherally of the bore hole 10a through the die 10. In other words, the flux lines of this magnetic field traverse the adjacent internal surface portions of the die 10 in planes which are normal to the longitudinal axis of the bore hole. The resulting hysteresis and eddy currents set up in the internal surface portions of the die 10 cause these portions of the die to be rapidly heated. The field penetration into the metal is of course very slight at the high frequency used, and hence the heating is strictly limited to the surface segments of the bore hole. By providing a magnetic field of sufficient intensity within the bore hole, the heating effect of the bore hole surface may be carried out with sufficient rapidity to prevent substantial amounts of heat from being conducted away from the internal surface portions of the die as the heat is generated. In fact, by providing a field of sufficiently high intensity, the internal surface areas of the die may be heated to a red temperature without raising the temperature of the outer surface portions of the die more than a few degrees.

It has been found that the magnetic permeability of magnetic steels normally used in the construction of dies and other parts of the character under consideration, decreases sharply when the steel is heated to a predetermined temperature. More specifically, it has been found that the temperature at which this permeability change occurs in a carbon steel part, for example, is at least equal to the temperature which must be imparted to the part in order to effect the desired case hardening of the part when it is subsequently subjected to a quenching operation. This sharp change in the magnetic permeability of those internal surface portions of the die 10 which are subjected to the high frequency magnetic field is utilized automatically to arrest the operation of the oscillator 13 when the indicated die portions are heated to the desired quenching temperature. Thus, it will be understood that the load imposed upon the oscillator 13 is definitely a function of the heat developed within the internal surface portions of the die 10. When the heat developed in these surface portions is decreased due to the sharp decrease in the permeability of the heated die parts which occurs when these parts are heated to the desired quenching temperature, the load imposed upon the oscillator 13 is sharply reduced. In response to this change in the oscillator load, the rectified grid current traversing the winding of the relay 40 and the resistor 34 is greatly increased. This relay is adjusted to operate in response to the described increase in rectified grid current flow therethrough. Upon operating, it opens its contacts 41 to de-energize the circuit breaker 50. At its contacts 43, the relay 40 de-energizes the winding 23a of the holding magnet 23. At its contacts 42, the relay 40 completes an obvious circuit for energizing the operating winding 20b of the solenoid 20.

The circuit breaker 50, upon restoring, opens its contacts 51 further to interrupt its own locking circuit. At its contacts 52, the circuit breaker 50 interrupts the anode current supply circuit for the tube 26, thereby to arrest the operation of the oscillator 13. When the winding 23a of the holding magnet 23 is de-energized the die 10 is released for movement along the inductor element 11 to the illustrated cooling position, such movement being effected through the influence of gravity pull upon the die 10 and being arrested when the lower face of the die contacts the upper surface of the member 53. When the solenoid 20 attracts its plunger 20a in response to the energization of its winding 20b, it pivots the actuator arm 17 against the bias of the spring 18 to open the valve 17, thereby to increase the flow of quenching liquid through the inductor element 11. Also incident to the pivotal movement of the valve actuating arm 17a, the contacts 17b are closed to complete a circuit through the switch contacts 38b for holding the winding 20b energized independently of the relay 40.

From the above explanation it will be understood that incident to the operation of the relay 40, the operation of oscillator 13 is arrested, the die 10 is moved from its heating position to its cooling position, and the flow of quenching liquid through the inductor element 11 is increased to enhance the quenching of the heated internal surface portions of the die. In this regard it will be understood that the quenching liquid in flowing through the wall openings 12 of the inductor 11 impinges upon the heated internal surfaces of the die 10 to rapidly cool these surfaces and thus effect the desired case hardening thereof. Incident to the described interruption of the anode current supply circuit for the tube 26, grid current flow through the winding 40 is obviously terminated causing this relay to release. Upon restoring, the relay 40 recloses its contacts 41 to reprepare the locking circuit for the circuit breaker 50. At its contacts 43, the relay 40 recompletes the circuit for energizing the holding magnet winding 23a, this operation being without effect since prior to its occurrence the die 10 is removed from the sphere of attractive influence of the magnet 23. At its contacts 42, the relay 40 interrupts the operating circuit for the solenoid winding 20b, but the latter circuit remains energized through the contacts 20b and the switch contacts 38b.

After the die 18 has been quenched in the manner explained above, the switch 38 may be returned to its normal position, wherein the contacts 38a and 38b are open. Incident to this operation, the solenoid 20 is de-energized, permitting the valve 17 to be closed under the influence of the spring 18. As the valve actuator arm 17a is operated to close the valve 17, the contacts 17b are opened, thereby to prevent premature energization of the solenoid 20 when the switch 38 is subsequently closed. Incident to the opening of the contacts 38a, the winding 23a of the holding magnet 23 is obviously de-energized. After the described operations are completed, the valve 16 may be closed to arrest the flow of quenching liquid through the inductor element 11, and the die 18 removed from its cooling position by pivoting the support assembly 53 away from the inductor element and then sliding the die downward until it is free of the inductor element. A second die may now be telescoped over the inductor element and the described operations repeated in the exact sequence described above.

From the foregoing explanation it will be understood that each die heating interval is determined solely by the temperature to which the internal die surfaces are heated when the high frequency magnetic field is applied thereto. This insures that successively selected dies will be internally heated to almost exactly the same temperature, regardless of fluctuations in the voltage of the anode current supply source 36 or fluctuations in any other variable factors which may cause variations in the density of the magnetic fields developed in the heating of different dies. This method represents a distinct departure from conventional practice, wherein the heating is effected on a timed basis utilizing conventional electronic timers for the purpose, and has distinct advantages over such conventional practice. Thus it makes the use of any timing device completely superfluous without requiring the use of equivalent devices. Further, by making the temperature of the die or work piece and not the elapsed time the controlling factor in determining the point at which the heating is arrested, fluctuations in the voltage of the anode current supply source 36 are rendered completely nonimportant in the operation of the apparatus to produce uniformly hardened dies. On this point it will be understood that the power which the high frequency generator 13 produces is approximately proportional to the square of the voltage impressed upon the anode 26a of the tube 26. Accordingly during a fixed selected time interval, the total amount of generated heat will vary with the square of the anode voltage. In conventional practice the factor of anode voltage fluctuations is taken into account by so selecting the timing interval that the required heating is produced therein when the minimum possible voltage is applied to the anode of the oscillator tube. This of course results in a waste of time and heat when the available voltage actually exceeds the minimum value used as the basis for determining the heating interval.

While one embodiment of the invention has been described, it will be understood that various modifications may be made therein which are within the true spirit and scope of the invention as defined in the appended claims.

I claim:

1. In apparatus for heating a magnetic part having a magnetic permeability which decreases sharply as said part is heated to a predetermined temperature, a high frequency electronic oscillator provided with a cathode-grid circuit and with an output circuit for impressing the generated high frequency magnetic field upon said part, thereby to heat said part to said predetermined temperature, the current traversing said cathode-grid circuit being sharply increased in response to said decrease in the permeability of said part, switching means provided with an operating winding serially included in said cathode-grid circuit and operative from one setting to a different setting in response to said increase in the current traversing said cathode-grid circuit, and means responsive to operation of said switching means to said different setting for arresting the operation of oscillator, thereby to discontinue the application of said high frequency magnetic field to said part.

2. In apparatus for heat treating a magnetic metal part which is movable from a heating position to a cooling position and has a magnetic permeability which decreases sharply as said part is heated to a predetermined temperature, a high frequency electronic oscillator provided with a cathode-grid circuit and with an output circuit for impressing the generated high frequency magnetic field upon said part, thereby to heat said part to said predetermined temperature, the current traversing said cathode-grid circuit being sharply increased in response to said decrease in the permeability of said part, switching means provided with an operating winding serially included in said cathode-grid circuit and operative from one setting to a different setting in response to said increase in the current traversing said cathode-grid circuit, and means responsive to the operation of said switching means to said different setting for effecting movement of said part from said heating position to said cooling position.

3. In apparatus for heating a magnetic metal part which is gravity biased to move from a heating position to a cooling position and has a magnetic permeability which decreases sharply as said part is heated to a predetermined temperature, magnet means for holding said part in said heating position, a high-frequency electronic oscillator provided with a cathode-grid circuit and with an output circuit for impressing the generated high frequency magnetic field upon said part, thereby to heat said part to said predetermined temperature, the current traversing said cathode-grid circuit being sharply increased in response to said decrease in the permeability of said part, electromagnetic switching means provided with an operating winding serially included in said cathode-grid circuit and operative from one setting to a different setting in response to said increase in the current traversing said cathode-grid circuit, and means responsive to the operation of said switching means to said different setting for controlling said magnet means to release said part for movement from said heating position to said cooling position.

4. In apparatus for heating and then quenching a magnetic part having a magnetic permeability which changes as said part is heated to a predetermined temperature, a conduit for delivering a quench liquid to said part, a high frequency electronic oscillator provided with a cathode-grid circuit and with an output circuit for impressing the generated high frequency magnetic field upon said part, thereby to heat said part to said predetermined temperature, the current traversing said cathode-grid circuit being sharply increased in response to said decrease in the permeability of said part, switching means provided with an operating winding serially included in said cathode-grid circuit and operative from one setting to a different setting in response to said increase in the current traversing said cathode grid circuit, and means responsive to the operation of said switching means to said different setting for changing the rate of liquid flow through said conduit.

5. Apparatus for internally heating a hollow metal piece to a quenching temperature and for then quenching the heated piece, comprising a high frequency source, a straight tubular inductor element energized from said source and telescoped through said piece, whereby a high frequency magnetic field is developed peripherally of the opening through said piece to heat the inner peripheral portion of said piece to a quenching temperature, said piece and said element being relatively movable between heating and quenching positions and the telescopic relationship between said piece and said element being maintained throughout such relative movement, said tubular element being provided with at least one quench liquid opening for playing a quench liquid upon the inner peripheral portion of said piece when said piece occupies its quenching position, means for flowing a quench liquid through said element, and means for effecting relative movement of said element and said piece to said quenching positions when said piece is internally heated to said quenching temperature.

6. Apparatus for internally heating a hollow metal piece to a quenching temperature and for then quenching the heated piece, comprising a high frequency source, a tubular inductor element energized from said source and telescoped through said piece, whereby a high frequency magnetic field is developed peripherally of the opening through said piece to heat the inner peripheral portion of said piece to a quenching temperature, said piece and said element being relatively movable between heating and quenching positions and the telescopic relationship between said element and said piece being maintained throughout such relative movement, said tubular element being provided with at least one quench liquid opening for playing a quench liquid upon the inner peripheral portion of said piece when said piece occupies its quenching position, means for flowing a quench liquid through said element, and means responsive to the heating of said piece to said quenching temperature for effecting relative movement of said element and said piece to said quenching positions.

7. Apparatus for internally heating a hollow metal piece to a quenching temperature and for then quenching the heated piece, comprising a high frequency source, a tubular inductor element energized from said source and telescoped through said piece, whereby a high frequency magnetic field is developed peripherally of the opening through said piece to heat the inner peripheral portion of said piece to a quenching temperature, said piece and said element being relatively movable between heating and quenching positions and the telescopic relationship between said element and said piece being maintained throughout such relative movement, said tubular element being provided with at least one quench liquid opening for playing a quench liquid upon the inner peripheral portion of said piece when said piece occupies its quenching position, means for continuously flowing a quench liquid through said element, means for effecting relative movement of said element and said piece to their relative quenching positions when said piece is internally heated to said quenching temperature, and means responsive to the heating of said piece internally to said quenching temperature for increasing the flow of quench liquid through said element.

8. Apparatus for internally heating a hollow metal piece to a quenching temperature and for then quenching the heated piece, comprising a high frequency source, a single turn inductor circuit coupled to said source and including a straight tubular element telescoped through said piece, whereby a high frequency magnetic field is developed peripherally of the opening through said piece to heat the inner surfaces of said piece to a quenching temperature, said piece being movable along said element from a heating position to a quenching position and the telescopic relationship between said element and said pieces being maintained during such movement of said piece, said tubular element being provided with at least one quench liquid opening for playing a quench liquid upon the inner surface of said piece when said piece is moved to its quenching position, means for flowing a quench liquid through said element, and means responsive to the heating of said piece internally to said quenching temperature for effecting movement of said piece from said heating position to said quenching position.

9. Apparatus for internally heating a hollow metal piece to a quenching temperature and for then quenching the heated piece, comprising a high frequency source, a single turn inductor circuit coupled to said source and including a straight tubular element telescoped through said piece, whereby a high frequency magnetic field is developed peripherally of the opening through said piece to heat the inner surface of said piece to a quenching temperature, said piece being movable along said element from a heating position to a quenching position and the telescopic relationship between said element and said piece being maintained during such movement of said piece, said tubular element being provided with quench liquid openings for playing a quench liquid upon the inner surface of said piece when said piece is moved to its quenching position, means for flowing a quench liquid through said element, thereby to cool said element during the internal heating of said piece, means responsive to the heating of said piece internally to said quenching temperature for effecting movement of said piece from said heating position to said quenching position, and means also responsive to the heating of said piece to said quenching temperature for increasing the flow of quench liquid through said element.

10. In apparatus for heating a magnetic part having a magnetic permeability which decreases sharply as said part is heated to a predetermined temperature, a high frequency electronic oscillator provided with a cathode-grid circuit and with an output circuit for impressing the generated high frequency magnetic field upon said part, thereby to heat said part to said predetermined temperature, the current traversing said cathode-grid circuit being sharply increased in response to said decrease in the permeability of said part, switching means provided with an operating winding serially included in said cathode-grid circuit and operative from one setting to a different setting in response to said increase in the current traversing said cathode-grid circuit, and means responsive to operation of said switching means to said different setting for discontinuing the application of said high frequency magnetic field to said part.

HERBERT F. STORM.

REFERENCES CITED

The following references are of record in the file of this patent:

UNITED STATES PATENTS

| Number | Name | Date |
|---|---|---|
| 1,412,484 | Mordey | Apr. 11, 1922 |
| 1,687,656 | Brown | Oct. 16, 1928 |
| 1,702,958 | Twyman | Feb. 19, 1929 |
| 1,756,131 | Ohl | Apr. 29, 1930 |
| 1,779,604 | Knerr | Oct. 28, 1930 |
| 1,920,646 | Kroger | Aug. 1, 1933 |
| 1,955,352 | Wallace | Apr. 17, 1934 |
| 1,975,812 | Wallace | Oct. 9, 1934 |
| 2,059,976 | Stargardter | Nov. 3, 1936 |
| 2,202,759 | Denneen et al. | May 28, 1940 |
| 2,264,301 | Denneen et al. | Dec. 2, 1941 |
| 2,288,033 | Somes | Jan. 30, 1942 |
| 2,293,851 | Rogers | Aug. 25, 1942 |
| 2,319,093 | Somes | May 11, 1943 |
| 2,324,525 | Mittleman | July 20, 1943 |
| 2,359,058 | Somes | Sept. 26, 1944 |
| 2,395,195 | Roberds | Feb. 19, 1946 |

OTHER REFERENCES

Heat Treating and Forging, pp. 89 through 92; Feb. 1941.

Electronic Industries, page 184; April 1944.